Patented Apr. 7, 1925.

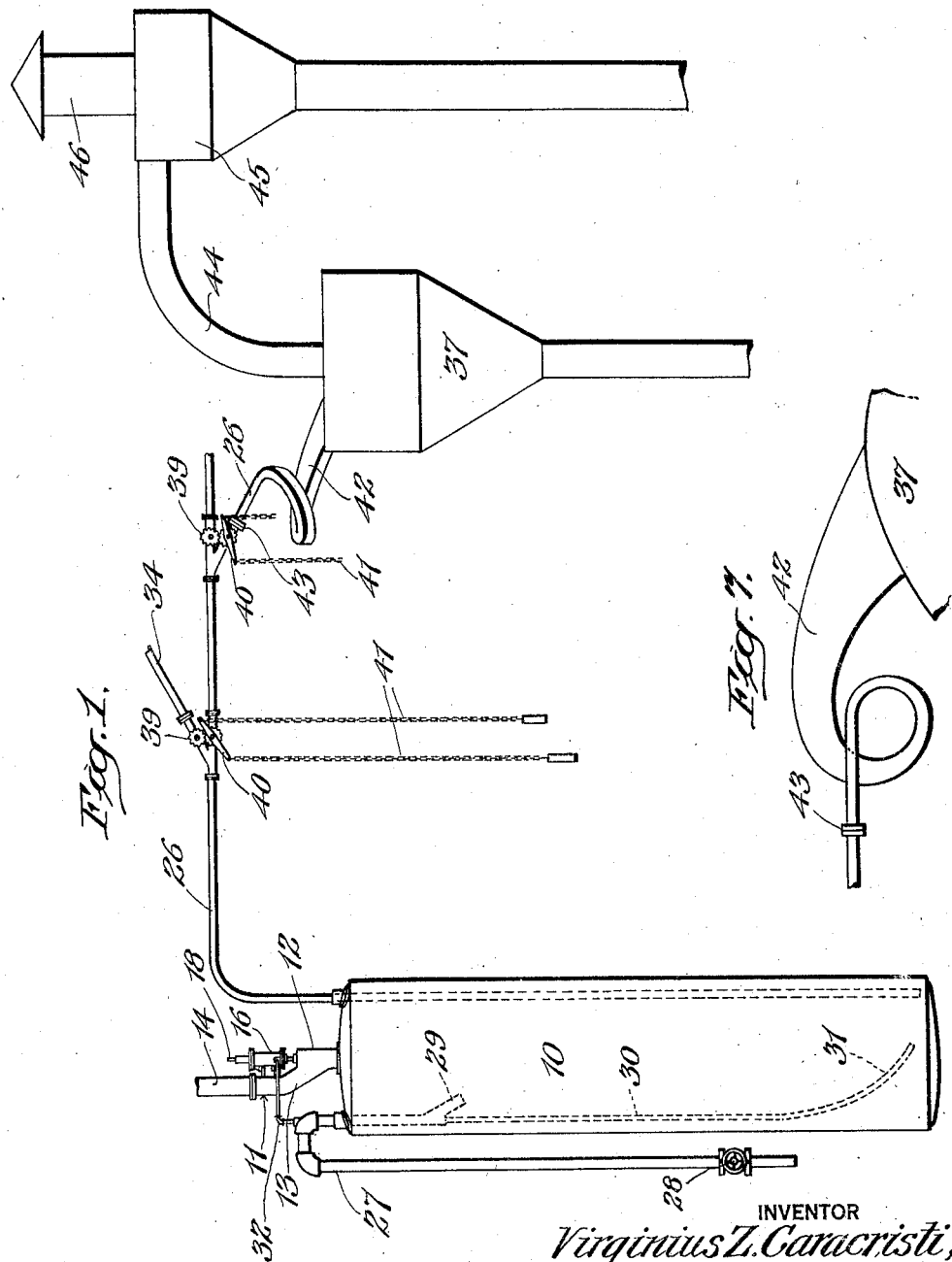

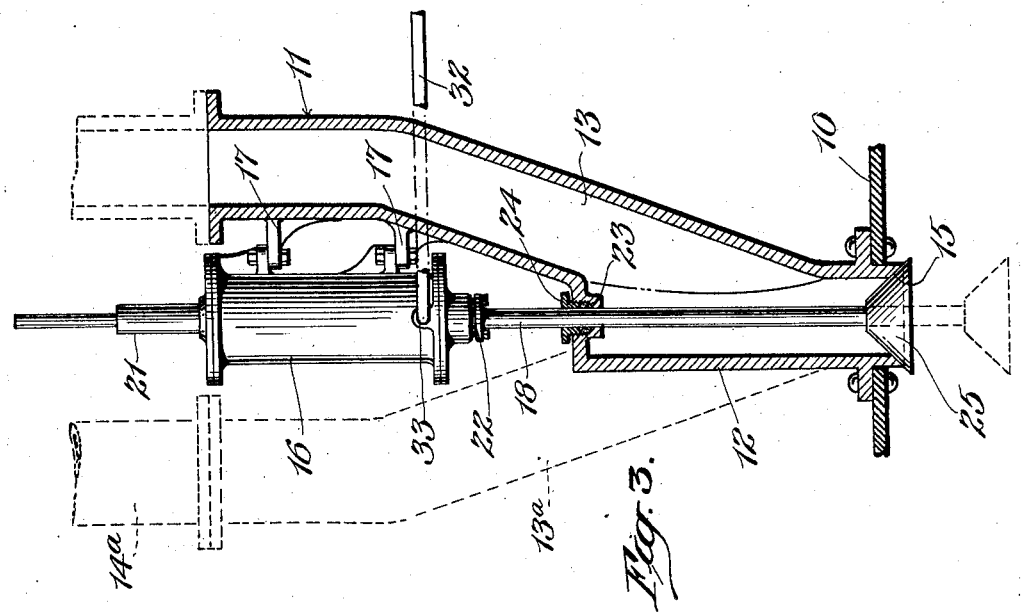
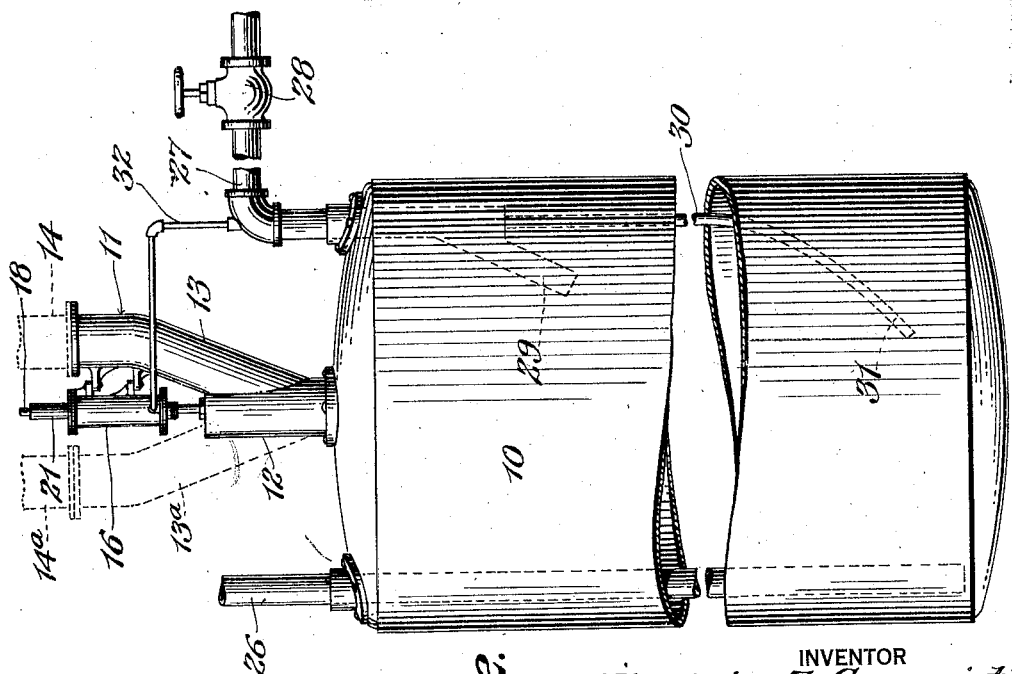

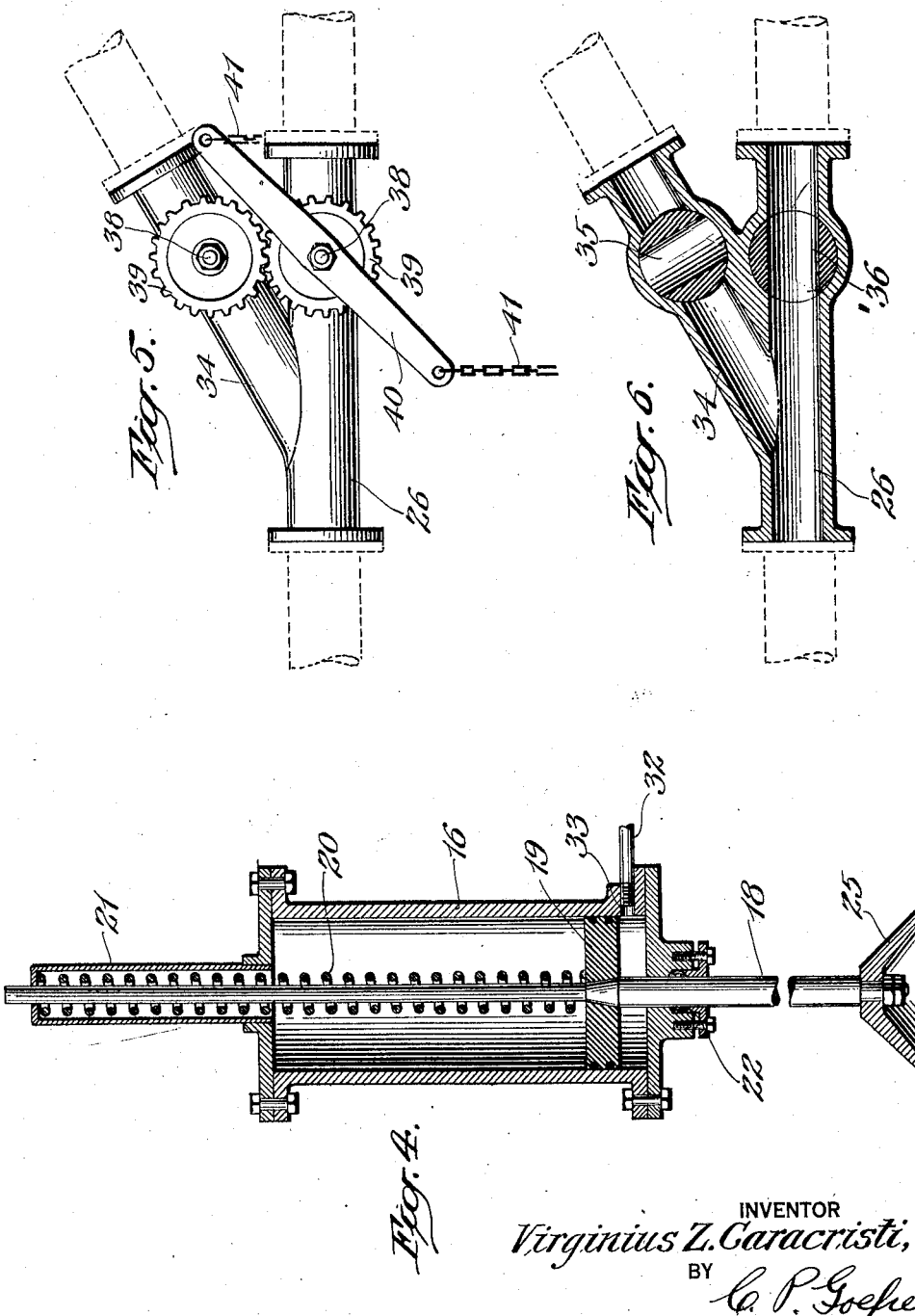

1,532,122

UNITED STATES PATENT OFFICE.

VIRGINIUS Z. CARACRISTI, OF BRONXVILLE, NEW YORK, ASSIGNOR TO LOCOMOTIVE PULVERIZED FUEL COMPANY, OF NEW YORK, N. Y., A CORPORATION OF DELAWARE.

PNEUMATIC CONVEYING APPARATUS AND THE LIKE.

Application filed April 3, 1919. Serial No. 287,157.

*To all whom it may concern:*

Be it known that I, VIRGINIUS Z. CARACRISTI, a citizen of the United States, and resident of Bronxville, county of Westchester and State of New York, have invented certain new and useful Improvements in Pneumatic Conveying Apparatus and the like, of which the following is a specification.

The invention in its broader aspects contemplates the feeding of finely divided solids or comminuted materials through a pipe or conduit from a tank by means of compressed air or gas and the utilization of a portion of the fluid for the purpose of cutting off further supply of the material to the tank prior to the admission of the pressure fluid.

My invention also comprehends the delivery of pressure fluid into the material within the tank adjacent to the outlet thereof whereby the material is prevented from packing and its entrance into the outlet facilitated.

In the accompanying drawings wherein I have illustrated one practical embodiment of the apparatus, Fig. 1 is an elevation illustrating the transporting means for the material and a separator to which the material is delivered;

Fig. 2 is an enlarged view of the material receiving tank;

Fig. 3 is an enlarged detail section through the material supply connection, showing the inlet valve;

Fig. 4 is an enlarged sectional view through the pressure receiving cylinder, illustrating the valve actuating means;

Fig. 5 is a detail elevation showing the interconnected valve gearing for actuating the valves controlling the passage of the fluid and comminuted material through the transporting pipes;

Fig. 6 is a sectional view through said valves; and

Fig. 7 is an enlarged detail plan view of the velocity reducing section of the conduit from which the material is delivered into the separator.

Referring in detail to the drawings wherein like reference characters designate corresponding parts throughout the several views, 10 indicates a suitable receiving tank for the finely divided solids or comminuted materials. This tank may be of any preferred construction and capacity. A supply pipe 11 is centrally secured to the upper end of the tank 10 and includes a vertically disposed portion 12 and an obliquely disposed portion 13 which extends upwardly from one side of the vertical portion 12 and is coupled at its upper end to a pipe or conduit 14 leading from a source of supply. If desired the comminuted material may be fed into the tank from two separate supply sources in which case the side wall of the vertical portion 12 of the inlet pipe is removed and said pipe is formed with a second upwardly extending obliquely inclined portion as indicated in dotted lines at 13ª, the upper end thereof being coupled to the pipe or conduit 14ª leading from a second supply source.

The lower end of the pipe 11 extends within the upper end of the tank 10 and is formed with a valve seat 15. A cylinder 16 is supported upon spaced brackets 17 which are formed upon the supply pipe 11, and through this cylinder the valve rod 18 extends. A piston 19 reciprocates within the cylinder 16 and is suitably fixed upon the valve rod. An expansion spring 20 surrounds the valve rod 18 and bears one of its ends against the piston 19. The other end of this spring is housed within a suitable casing 21 fixed to the upper end of the cylinder 16 and through which casing the valve rod is freely movable. The other end of the spring 20 has bearing contact with the upper end wall of the casing 21.

The valve rod 18 extends through a suitable stuffing box 22 on the base of the cylinder 16 and is movable through a guide opening in the horizontal wall 23 of the pipe 11 at the upper end of the vertical section 12 of said pipe. A suitable packing gland 24 is threaded into this wall to compress a suitable packing material around the valve rod.

To the lower end of the rod 18 the conical valve 25 is fixed for engagement with the vave seat 15. It will be understood that the spring 20 by its expansive action normally retains this valve in an open position.

26 designates the outlet pipe for the comminuted material which extends into the tank through the top thereof and has its lower open end located adjacent to the bottom of the tank. The pipe 27 from a source of compressed gas or air is also disposed through the top wall of the tank, and is provided with a valve 28. The main outlet 29 for the compressed gas or air discharges into the upper end of the tank 10. The pipe 29 is also provided with a secondary outlet pipe 30 which extends downwardly to a point adjacent the bottom of the tank, and has its lower end curved inwardly as shown at 31 to direct a jet of compressed gas or air into the material and towards the lower end of the outlet pipe 26.

A pipe 32 of relatively small diameter is connected at one of its ends to the pipe 27 at a point between the valve 28 and the tank 10. The other end of this pipe 32 is connected to the lower end of the cylinder 16 as shown at 33. It will thus be understood that a portion of the compressed air or gas will be delivered through this pipe 32 when the valve 28 is open, into the lower end of the cylinder 16 and beneath the piston 19 therein. The purpose of this arrangement will be hereinafter disclosed.

The outlet pipe 26 is provided with one or more branch pipes 34 and in each of these branch pipes a rotary valve plug 35 is arranged to open or close the passage through said pipe. A similar valve plug 36 is also mounted in the main pipe line 26 contiguous to the valve plug 35. The main pipe line 26 and the branch pipe 34 are each connected to a common cyclone type of separator whereby the air or other gaseous fluid is separated from the material and exhausted to the atmosphere. Such a separator I have illustrated in Fig. 1 of the drawings and designated 37.

In the operation of the apparatus, it is of course essential that a passage from the outlet pipe 26 to at least one of the separators should be open. To this end, the valve plugs 35 and 36 are each provided upon one end with stems 38 upon which the gears 39 are fixed. These gears have intermeshing engagement with each other as clearly shown in Fig. 5 of the drawing. Upon the stem 38 of one valve plug a lever 40 is fixed intermediate of its ends. To each end of this lever a pull-chain 41 is attached. Upon a comparison of Figures 5 and 6 of the drawings it will be readily seen that when one of the chains 41 is pulled, both valve plugs will be rotated and one plug will be moved to open position while the other plug will be moved to its closed position. When the other chain 41 is pulled, the reverse operation occurs. Thus, it is apparent that there will always be an open passage through either the main pipe line 26 or the branch pipe 34 through which the comminuted material and the compressed air or gas will be delivered to a separator.

In order to effect a thorough separation of the materials from the compressed fluid, I have found it desirable to reduce the velocity of the material prior to its discharge into the separator. To this end, therefore, I provide a convolute delivery member 42 which is preferably of flat or rectangular form in cross-section and gradually increases in area from one end to the other. The smaller end of this delivery member is coupled to the transporting pipe or conduit 26, or one of its branches as shown at 43, while the larger flaring end of the member 42 extends through an opening in the side wall of the separator casing and is suitably secured to said wall. As the specific construction of the separator constitutes no part of the present invention, it is not herein illustrated and described in detail. It will suffice to state that the comminuted solid material is precipitated within the casing in the usual manner of cyclonic separators. The air or gas finds an escape from the casing through the pipe 44, from which it is delivered into a second separator 45, where such particles of solid material as may have been carried in suspension are separated. The air or gas is discharged from the second separator through the pipe 46 to the atmosphere.

From the foregoing description of the several structural features of the apparatus, its operation in practice will be understood as follows:

The finely divided solids or comminuted material, such, for instance, as pulverized fuel, is delivered through the inlet pipe 11 and past the open valve 25 into the tank 10. When a predetermined quantity of the material has been delivered to the tank the valve 28 is opened. The compressed air or gas flowing through the pipe 27 enters the pipe 32 and is delivered into the cylinder 16 beneath the piston 19. This piston is thereby forced upwardly within the cylinder against the action of the spring 20 and the valve 25 is moved into tight engagement against the seat 15. The greater part of the pressure fluid is delivered through the outlet 29 into the upper portion of the tank 10, and exerts a pressure upon the materials to force the same out and up through the outlet pipe 26. Pressure fluid is also delivered through the pipe 30 into the lower end of the tank for the purpose of aerating the material to prevent packing thereof and to facilitate its flow into the outlet pipe 26. The material under pressure is transported through the pipe 26 or one of its branches 34 as the case may be and finally discharged through the convolute pipe section or member 42 into the separator. When substantially all of the material has thus been transported from the tank 10, the valve 28 is closed and the remaining compressed air or gas within the tank finds an outlet through the pipe 26. The valve 15 is then immediately forced to its former normal open position by the expansion of the spring 20 and the feed of the material into the tank is continued. When the tank is again filled with the comminuted material the valve 28 is opened and the operation above described repeated. In this manner, it will be appreciated that finely divided or comminuted solids may be transported for considerable distances and without waste. By automatically cutting off the feed of the material to the tank by fluid pressure prior to the accumulation of effective discharge pressure within the the upper end of the tank, the possibility of back flow of the material and the escape of the pressure fluid into the supply connection is obviated. Also by reason of the fact that the material in the lower portion of the tank is aerated and prevented from packing, its free flow into the outlet pipe is assured and clogging of the pipe prevented.

The apparatus which I have herein illustrated and described is merely illustrative of one practical embodiment which may be employed to accomplish the purpose of the present invention. It is, however, to be understood that the invention may also be exemplified in various other forms of apparatus and that the several detail parts thereof are likewise susceptible of considerable modification and change without departing from the essential features, or sacrificing any of the advantages of the invention as claimed.

I claim:

1. A system for transporting comminuted materials comprising, in combination, a material receiving tank, a material supply connection therefor, a valve controlling said supply connection, a material outlet pipe, means for supplying pressure fluid to the tank to discharge the material through the outlet pipe, and means actuated by a portion of the pressure fluid taken from the supply line before delivery into the tank for automatically closing the material supply connection valve prior to the accumulation of effective discharge pressure in the tank whereby escape of the pressure fluid through the material supply connection is prevented.

2. A system for transporting comminuted materials comprising, in combination, a material receiving tank, a material supply connection therefore, a valve controlling said supply connection, a material outlet pipe, means for supplying pressure fluid to the tank to discharge the material through the outlet pipe, a pressure receiving cylinder, said controlling valve for the material supply connection having a rod extending through the cylinder, a piston on the valve rod, and means for utilizing a portion of the pressure fluid to move said piston to close the valve prior to the accumulation of effective discharge pressure in the tank.

3. A system for transporting comminuted materials comprising, in combination, a material receiving tank, a material supply connection therefor, a valve controlling said supply connection, a material outlet pipe, means for supplying pressure fluid to the tank to discharge the material through the outlet pipe, a pressure receiving cylinder, said controlling valve for the material supply connection having a rod extending through the cylinder, a piston on the valve rod, and means for utilizing a portion of the pressure fluid to move said piston to close the valve prior to the accumulation of effective discharge pressure in the tank and a spring operating upon said piston to return the valve to its open position.

4. A system for transporting comminuted materials comprising, in combination, a material receiving tank, a material supply connection therefor, a normally open valve controlling said connection, a discharge outlet from the tank, a pressure supply connection to the tank, a valve for controlling the admission of pressure through said connection, pressure operated means for closing the valve in the material supply connection, and means for admitting pressure to said valve closing means from a point on the tank side of the valve which controls the pressure supply connection but in advance of the point of discharge into the tank.

In testimony that he claims the foregoing as his invention, he has signed his name hereunder.

VIRGINIUS Z. CARACRISTI.